ly of New York, in the county of New York and # UNITED STATES PATENT OFFICE.

WILLIAM S. ROGERS, OF NEW YORK, N. Y.

DENTIFRICE.

1,379,046.   Specification of Letters Patent.   Patented May 24, 1921.

No Drawing.   Application filed September 23, 1919. Serial No. 325,667.

*To all whom it may concern:*

Be it known that I, WILLIAM S. ROGERS, a citizen of the United States, and resident of New York, in the county of New York and State of New York, have invented an Improvement in Dentifrices, of which the following description is a specification.

This invention relates to a dentifrice and is based upon a discovery in the art and practice of dentistry.

The object of the invention is to produce a dentifrice which while thoroughly effective for maintaining the cleanliness of the teeth will have no detrimental effect, but on the contrary will maintain a healthy condition of the teeth and gums, and under some conditions of disease will restore to health the alveolar tissue.

Pyorrhoea alveolaris is very prevalent, but its origin and its cause are obscure and have not been satisfactorily ascertained.

It has been considered by some pathologists to be a systemic disease.

It is consistent with the observed conditions and symptoms to assume that it may be started by some slight lesion of the gum, such as may be made by the tooth brush, in conjunction with a dentifrice containing abrasive material of a harsh irritating nature and especially when the dentifrice also contains soap.

The irritating particles of such a dentifrice may be forced in between the teeth and gums in the operation of brushing the teeth and may remain there together with detritus of food which may also become lodged between the teeth and gums.

The inert abrasive matter of the dentifrice, being a foreign body, has an irritating effect and tends to wedge the gums apart from the teeth and thus to afford a breeding place for bacteria in connection with the decaying food particles.

The bacteria may be of the acid producing varieties and thus change the naturally alkaline secretions of the mouth to acid which is injurious to the teeth and leads to decay.

As such conditions persists the irritation increases and may give rise to pus-producing bacteria and to the formation of pus-pockets between the teeth and gum; and the free alkali of the soap, if there be any, acts as an irritant and injures the teeth and causes decay.

My aim accordingly has been to discover a dentifrice which would be efficient to render the teeth clean, and to polish them highly in order to maintain their cleanliness, while eliminating all the objectionable or dangerous materials such as soap and irritating abrasive materials, and I have discovered that by mixing finely divided sulfur with a suitable alkaline substance such as perborate of soda, not only does the combination yield a highly satisfactory and efficient cleansing and polishing dentifrice, but also that it is non-irritating, and even has a curative effect in certain unhealthy or pathogenic conditions of the teeth and gums.

I find also that a dentifrice of this compositon has the effect of dissolving or disintegrating and loosening tartar, which may be owing to some chemical reaction, the nature of which I have not yet been able to ascertain, between the sulfur and the lime which is a principal component of the tartar.

I have also found that if the dentifrice does become lodged between the teeth and gums it exerts a beneficial or curative effect as it tends to inhibit the growth of harmful bacteria.

I find that a satisfactory alkaline component to be combined with the sulfur is perborate of soda in the proportion of about twenty parts by weight to eighty parts of the sulfur although their proportion may be varied; and the kind of sulfur which I have found most suitable is what is known as sulfur lotum, or the washed sulfur of commerce.

The dentifrice is preferably flavored with a small amount of oil of gaultheria which preferably is incorporated with the sulfur before mixing in the perborate of soda.

What I claim is:—

1. A dentifrice including in its composition sulfur and an alkaline material substantially as described.

2. A dentifrice compounded with sulfur lotum and perborate of soda.

In testimony whereof I have signed my name to this specification.

WILLIAM S. ROGERS.